Nov. 7, 1933.  P. H. SEWARD  1,934,241
PIPE COUPLING
Filed Aug. 4, 1927
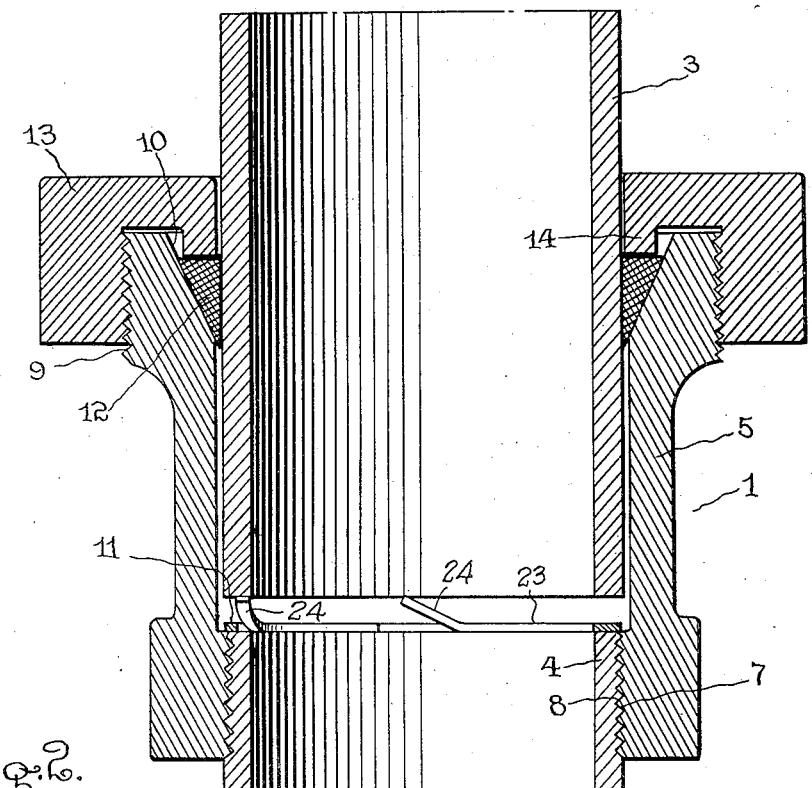
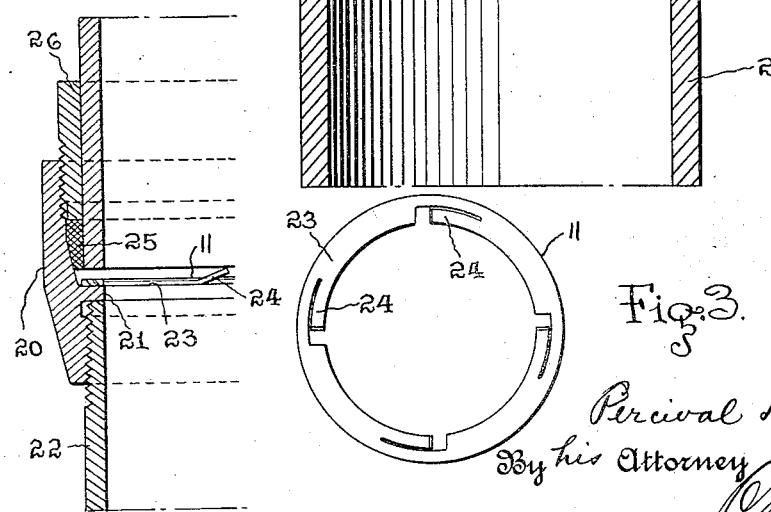

Patented Nov. 7, 1933

1,934,241

UNITED STATES PATENT OFFICE 1,934,241

PIPE COUPLING

Percival H. Seward, Brooklyn, N. Y., assignor to American Radiator Company, New York, N. Y., a corporation of New Jersey Application August 4, 1927. Serial No. 210,492

4 Claims. (Cl. 285—122)

My invention relates to new and useful improvements in pipe couplings, and more particularly to a coupling having provision for longitudinal expansion of pipe sections.

An object of my invention is to provide a pipe coupling which will permit unobstructed expansion and contraction of a pipe line within its predetermined length.

Another object is to provide a simple and efficient pipe coupling.

I have found that in assembling sectional pipe which is to be subjected to expansion and contraction, that the pipe fitter frequently fails to leave the necessary space between the ends of adjacent pipe sections to permit of expansion and contraction in the line after assembly. This is particularly true in the formation of risers in which the pipe sections are in vertical alinement, and in which one section may be rested directly upon the section immediately below. By my invention this fault in pipe line construction is avoided and the sections when assembled are properly spaced apart to permit adequate expansion.

The invention consists in the improved construction and combination of parts, to be more fully described hereinafter, and the novelty of which will be particularly pointed out and distinctly claimed.

In the accompanying drawing I have fully and clearly illustrated a preferred embodiment of my invention to be taken as a part of this specification, and wherein—

Figure 1 is a vertical central section through a coupling showing my invention;

Fig. 2 is a vertical central section showing a modification thereof, and

Fig. 3 is a detail.

Referring to the drawing by characters of reference, 1 designates, generally, a pipe line formed of any number of pipe sections, of which but two are shown, as at 2, 3. The section 2 is provided at its free end 4 with a socket member in the form of a projecting sleeve 5 of larger internal bore than the external diameter of section 2, so that the end of section 2 forms a shoulder, as at 6, at the inner end of the said socket member. The sleeve 5 is preferably provided at one end with internal threads 7 for engagement with an external thread 8 on the end of section 2, but the sleeve and section may be formed integral, or may be joined by welding, or the like. At its other end the sleeve 5 has an external thread 9 and has its inner end portion beveled or countersunk, as at 10, to form an outward flare. Within the sleeve 5 is a spacer member indicated generally at 11 which rests upon the shoulder 6 and is of sufficient rigidity to support the weight of substantially five hundred pounds, but collapsible under the expansive force of a section to permit the pipe to expand into the space thus provided between the sections. This spacer member 11 is preferably in the form of an annular washer 23 having spring lugs 24 struck up therefrom, as shown in Fig. 3, or any suitable device of a like nature. One end of the other pipe section 3 which, as shown, is of uniform external diameter, fits within the sleeve 5 and abuts the spacer member 11. Within the recess formed by the bevel 10 and pipe section 3, is a sealing or packing ring 12, preferably of lead, or other suitable material to prevent egress of fluid from the pipe line. The packing ring is held in place by a nut 13 having an annular flange 14 which engages the ring 12 as the nut 13 is screwed down on the threads 9 of the sleeve 5. The nut 13 surrounding the sleeve 5 serves to strengthen it against the lateral component of force exerted by the packing ring as it is forced to its seat between the pipe section 3 and the sleeve 5.

In the modification, Fig. 2, the sleeve 20 has an internal annular bead or flange 21 below which the sleeve is internally threaded to engage the thread on the upper end of a pipe section 22. The sleeve is screwed down upon the section 22 until the flange 21 abuts the pipe end. A spacer member 11 which I have also shown in this modification as a washer 23 having spaced resilient lugs 24 struck up therefrom, is then placed within the sleeve 20 upon the flange 21. A second pipe section may now be inserted in the sleeve until it rests against the resilient lugs 24. Above the flange 21 the sleeve 20 has a downward and inward taper or bevel to receive a packing ring 25 of lead or other suitable material, which is forced into the annular space between the sleeve and pipe section, which is of downward decreasing cross section, by a follower or packing nut 26.

I preferably form the sleeves 5 and 20 of metal such as cast-iron and the washer 23 is also of metal, such as sheet-steel.

What I claim and desire to secure by Letters Patent of the United States is:—

1. A device of the character described, comprising a pipe section having an end of enlarged internal diameter to provide an internal shoulder, a second pipe section telescoping said end of enlarged diameter, a spacer member seated on said shoulder between said pipe sections, said spacer member having resilient lugs engaging said second pipe section to space said sections longitudinally of each other, and sealing means between said first and said second pipe sections.

2. A device of the character described, comprising a pipe section, a sleeve of internal diameter greater than the diameter of said section secured thereon and projecting therefrom, said sleeve having an annular internal flange overlying and seating on the end of said section to provide an outwardly facing annular shoulder, said sleeve being internally flared outwardly for a portion of its length beyond said flange, an annular resilient metallic spacer member seated on said shoulder, said spacer member having lugs struck up therefrom, a second pipe section telescoping said sleeve and seated on said lugs for movement toward said first section upon compression of the resilient lugs, packing seated between said flared portion and said second pipe section, and a packing nut threadedly engaging said sleeve to wedge said packing between said sleeve and said second pipe section.

3. An expansion joint for a pipe stack comprising a socket arranged to receive a pipe end, said socket having an interior shoulder for said pipe end, and a member having yielding fingers positioned between said shoulder and said pipe end for temporarily sustaining the weight of said pipe in spaced relation to said shoulder.

4. An expansion joint for a pipe stack comprising a socket arranged to receive a pipe end, said socket having an interior shoulder for said pipe end, and a member having off-set yielding fingers positioned between said shoulder and said pipe end for temporarily sustaining the weight of said pipe by said fingers in spaced relation to said shoulder.

PERCIVAL H. SEWARD.